(12) United States Patent
Starner et al.

(10) Patent No.: US 6,386,272 B1
(45) Date of Patent: May 14, 2002

(54) DEVICE AND METHOD FOR DETECTING FOULING IN A SHELL AND TUBE HEAT EXCHANGER

(75) Inventors: Keith E. Starner, York; John C. Hansen, Spring Grove, both of PA (US)

(73) Assignee: York International Corporation, York, PA (US)

( * ) Notice: Subject to any disclaimer, the term of this patent is extended or adjusted under 35 U.S.C. 154(b) by 0 days.

(21) Appl. No.: 09/493,131

(22) Filed: Jan. 28, 2000

(51) Int. Cl.[7] .............................. G01K 1/14; G01K 1/08
(52) U.S. Cl. .................. 165/11.1; 165/303; 62/125; 374/147; 374/148
(58) Field of Search .................. 165/11.1, 95, 303; 374/141, 147, 148; 62/125

(56) References Cited

U.S. PATENT DOCUMENTS

| | | | |
|---|---|---|---|
| 3,033,030 A | 5/1962 | Heller | |
| 4,375,991 A | * 3/1983 | Sachs et al. | 165/95 X |
| 4,396,300 A | * 8/1983 | Characklis et al. | |
| 4,556,019 A | 12/1985 | Wynnyckyj et al. | |
| 4,559,818 A | 12/1985 | Tsang et al. | |
| 4,603,660 A | 8/1986 | Wynnyckyj et al. | |
| 4,766,553 A | 8/1988 | Kaya et al. | |
| 4,918,426 A | 4/1990 | Butts et al. | |
| 5,105,366 A | 4/1992 | Beckey | |
| 5,109,677 A | 5/1992 | Phillippe | |
| 5,429,178 A | 7/1995 | Garey et al. | |
| 5,477,731 A | 12/1995 | Mouton | |
| 5,499,197 A | 3/1996 | Fou | |
| 5,539,382 A | * 7/1996 | Duff et al. | 165/11.1 X |
| 5,546,113 A | 8/1996 | Izumi | |
| 5,559,535 A | 9/1996 | Otsuka et al. | |
| 5,590,706 A | 1/1997 | Tsou et al. | |
| 5,615,733 A | 4/1997 | Yang | |
| 5,615,953 A | * 4/1997 | Moskal | 374/141 |
| 5,623,426 A | 4/1997 | Ozawa et al. | |
| 5,681,988 A | 10/1997 | Koch et al. | |
| 5,714,939 A | 2/1998 | Song | |
| 5,751,304 A | 5/1998 | Hirabayashi et al. | |
| 5,774,056 A | 6/1998 | Berry, III et al. | |
| 5,814,212 A | 9/1998 | Hsu | |
| 5,850,183 A | 12/1998 | Berry, III | |
| 5,992,505 A | * 11/1999 | Moon | 165/11.1 |

* cited by examiner

*Primary Examiner*—Ljiljana Ciric
(74) *Attorney, Agent, or Firm*—Finnegan, Henderson, Farabow, Garrett & Dunner, LLP (57) ABSTRACT

A system for calculating the degree of fouling in a heat exchanger having at least one longitudinal tube inside of a shell, the shell having a first heat exchange medium flowing inside the tube and a second heat exchange medium flowing across the outside surface of the tube. The apparatus includes a first temperature sensor, a device for determining the temperature of the tube at a first axial position of the tube, and a fouling detector. The first temperature sensor senses the temperature of the tube at a first axial position of the tube. The fouling detector calculates the degree of fouling in the tube based on the initial temperature difference between the temperature of the tube and the temperature of the first heat exchange medium in the tube at the first axial position, and a later temperature difference between the temperature of a surface of the tube and the temperature of the first heat exchange medium in the tube at the first axial position.

32 Claims, 3 Drawing Sheets

DEVICE AND METHOD FOR DETECTING FOULING IN A SHELL AND TUBE HEAT EXCHANGER

BACKGROUND OF THE INVENTION

1. Field of the Invention

This invention relates to heat exchanger condensers and evaporators, particularly those used in HVAC applications. In particular, the invention relates to a device and method for detecting fouling in the tubes of a shell and tube type condenser, where cooling water flows through tubes, while a refrigerant flows through the shell and is cooled and condensed by the outside surfaces of the tubes.

2. Description of the Related Art

Refrigeration systems of the type used to cool large quantities of water, or otherwise provide a large cooling capacity, typically include a heat exchanger condenser having separated passageways. One passageway of the condenser carries a refrigerant to be condensed, and another carries the heat transfer fluid to cause the condensation, usually water. As the water travels through the tubes, it absorbs heat from the refrigerant vapor, causing the refrigerant to condense to a liquid state. After exiting the condenser, the refrigerant liquid then proceeds to an expansion valve, and then to an evaporator, where the refrigerant liquid turns from a liquid to a vapor phase. After exiting the evaporator, the refrigerant proceeds to a compressor and back to the condenser, repeating the refrigeration cycle. In the evaporator, a heat transfer fluid is cooled by the evaporation of the refrigerant. This heat transfer fluid leaving the evaporator is typically routed to a cooling system for cooling the spaces to be conditioned, or it can be used for other refrigeration purposes.

A long standing problem affecting the performance of heat exchanger condensers is fouling of the condenser tubes. Fouling occurs inside condenser tubes for several reasons. In particulate fouling, particles such as dirt and rust that are contained in the cooling water or other fluid flowing inside a tube will adhere to the tube inner surface. The presence of these particles on the inner surface of the tube reduces the heat transfer across the tube wall. In precipitation fouling, which may occur simultaneously with particulate fouling, chemicals (dissolved solids) that are contained in the cooling water or other fluid will deposit on the inner surface of the tube if the concentration of the chemicals is higher than the solubility limit at the water temperature. The precipitation of the chemicals onto the warmer tube inner surface is caused by this reverse solubility of the chemicals typically found in cooling water. The presence of precipitate fouling often results in an increase in the rate of particulate fouling, because particles such as rust or dirt will more easily adhere to the inner tube surface if chemicals have already adhered to the inner tube surface. Other types of fouling such as corrosion are also known.

In any type of fouling, particulates of material adhere to the inside surface of the condenser tubes, decreasing the heat transfer rate that occurs across walls of the tubes. The fouling results in a raised tube temperature and condensing saturation temperature, with a resulting increase in the system power requirement. In a conventional HVAC system, a relatively small amount of fouling can increase the annual utility costs to a building owner by thousands of dollars. In order to remove or substantially decrease the fouling on the condenser pipes, routine maintenance, such as tube cleaning or water treatment, must be performed on the tubes. This maintenance causes interruptions in the performance of the HVAC systems, however, and can be costly and time-consuming.

For these reasons, it is preferable to perform maintenance only when it is necessary, in order to reduce the maintenance costs, while also ensuring that the tubes do not become overly fouled so as to cause significant performance loss. It is therefore desirable to have a reliable method and apparatus for detecting the amount of fouling in the condenser tubes so that timely and proper maintenance can be provided to the condenser tubes.

Typical methods for detecting the presence and amount of waterside fouling have numerous drawbacks, such as inaccurate detection of fouling. For example, in one method, waterside fouling is suspected if the indicated pressure of the condenser increases compared to the design or start-up value. However, such an increase in pressure can be due to a number of factors independent from waterside fouling, such as the presence of non-condensable gas such as air on the refrigerant side of the tubes. The presence of a non-condensable may increase the indicated pressure by adding the partial pressure of the gas to the previous pressure. In addition, the non-condensable gas may thermally blanket the tubes, thereby increasing the heat transfer resistance, resulting in raised saturation pressure. In an operating condenser, it is often difficult to independently determine the extent to which air is in fact influencing the indicated pressure. Therefore, it is difficult to tell whether changes in performance are the result of fouling in the condenser tubes alone, or whether they are a result of other factors.

Therefore there is a need for a detection system and method that will accurately, efficiently, and inexpensively detect fouling in the condenser tubes.

SUMMARY OF THE INVENTION

The object of the present invention therefore is to provide an improved system and method for detecting fouling in a heat exchanger.

The advantages and purposes of the invention will be set forth in part in the description which follows, and in part will be obvious from the description, or may be learned by practice of the invention. The advantages and purposes of the invention will be realized and attained by means of the elements and combinations particularly pointed out in the appended claims.

To attain the advantages and in accordance with the purposes of the invention, as embodied and broadly described herein, the invention includes a shell and tube heat exchanger system for transferring heat between a refrigerant flowing over an outer surface of a tube and a heat transfer fluid flowing through the tube. The heat exchanger system includes a tube including a first end and second end, a first temperature sensor for sensing the temperature of the tube, a device for determining the temperature of the heat transfer fluid inside the tube, and a fouling detector. The fouling detector calculates the degree of fouling in the tube based on the temperature of the tube and the temperature of the heat transfer fluid in the tube at an initial time and a later time.

In a further aspect of the invention, the invention includes a system for calculating the degree of fouling in a heat exchanger. The heat exchanger has at least one longitudinal tube inside of a shell. A first heat exchange medium flows inside the tube and a second heat exchange medium flows across the outside surface of the tube. The system includes a first temperature sensor for sensing the temperature of the tube at a first axial position of the tube, a device for determining the temperature of the first heat exchange medium inside the tube at the first axial position, and a fouling detector. The fouling detector calculates the degree of fouling in the tube based on the initial temperature difference between the temperature of the tube and the temperature of the first heat exchange medium in the tube at the first axial position, and a later temperature difference between the temperature of a surface of the tube and the temperature of the first heat exchange medium in the tube at the first axial position.

In a yet further aspect of the invention, the invention includes a method of detecting fouling in a heat exchanger having a first heat exchange fluid flowing through a tube and a second heat exchange fluid flowing over an outer surface of the tube. In the method of the present invention, a first temperature of the tube is sensed at a first axial position. A first temperature of the first heat exchange fluid in the tube at a position corresponding to the first axial position is simultaneously determined. The difference between the first temperature of the tube and the first temperature of the first heat exchange fluid in the tube is then calculated. Next, a second temperature of the tube at the first axial position is sensed after operating the condenser for a period of time, and a second temperature of the first heat exchange fluid in the tube at a position corresponding to the first axial position at the second point in time is simultaneously determined. The difference between the second temperature of the tube and the second temperature of the first heat exchange fluid in the tube is the then determined. Lastly, the fouling resistance of the tube is determined as a function of the difference between the first temperature of the tube and the first temperature of the first heat exchange fluid in the tube and the difference between the second temperature of the tube and the second temperature of the first heat exchange fluid in the tube.

In another aspect of the invention, the invention includes a method of detecting fouling in a heat exchanger having a first heat exchange fluid flowing through a tube and a second heat exchange fluid flowing over an outer surface of the tube. This method includes the steps of sensing the temperature of the first heat exchange fluid flowing through the tube and the temperature of the tube at two different times, and determining the amount of fouling in the tube based on the above sensed temperatures.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

In the drawings.

DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

While the present invention has broader application regarding a heat exchanger assembly for transferring heat between a first heat exchanger medium flowing in a tube and a second heat exchange medium flowing over a tube, the invention was developed and has particular application in a condenser assembly in an HVAC liquid-cooled chiller system. In a typical condenser, a refrigerant vapor enters the shell of a condenser and flows across the outside surfaces of a plurality of cooling tubes. Each of the cooling tubes contains a lower temperature heat transfer fluid, such as water, circulating inside the tubes. As the refrigerant flows across the outside surfaces of the cooling tubes, heat is transferred to the lower temperature heat transfer fluid circulating in the tubes, so that the refrigerant vapor drops to below a saturation temperature and condenses. After the refrigerant condenses on the outside surfaces of the cooling tubes, the refrigerant exits the condenser as a refrigerant fluid, while the heat transfer fluid leaves the cooling tubes in a warmed state to recirculate to a cooling tower.

In condensers such as that described for the present invention, fouling occurs in the tubes of the condenser over a period of time. The fouling can include both particulate fouling and precipitation fouling, as previously described, as well as other types of fouling. The result of fouling is the presence of fouling materials on the inside of the cooling tubes, thereby reducing the rate of heat transfer that occurs across the tube walls at fixed fluid temperatures. In order to obtain the same heat load, greater temperature differences are required, thereby increasing the system power requirements. If the fouling is allowed to accumulate without detection and adequate cleaning, condenser performance may be adversely affected.

In accordance with the present invention, a heat exchanger is provided with heat transfer tubes, temperature sensors, and a fouling detector for calculating the degree of fouling that has occurred in a heat transfer tube. The fouling detector calculates the degree of fouling in the tube based on the initial temperature difference between the temperature of a surface of a tube and the temperature of a heat transfer fluid in the tube at a first axial position, and a later temperature difference between the temperature of a surface of the tube and the temperature of the heat transfer fluid in the tube at the first axial position. This method of calculating the degree of fouling focuses on changes in temperature in the tube, thereby functioning independently of any changes that may have occurred on the refrigerantside of the heat exchanger.

In one embodiment of the present invention, the heat exchanger is a shell and tube condenser for transferring heat between a refrigerant flowing over an outer surface of a tube and a heat transfer fluid flowing through the tube, thereby causing condensation of at least a portion of the refrigerant. In the embodiment shown in FIGS. 1–5, the heat exchanger 10 is a shell and tube condenser. The heat exchanger of the present invention can alternately be an evaporator, as will be discussed later. As embodied herein and shown in FIGS. 1–5, the heat exchanger 10 includes an elongated chamber or shell casing 12. The shell casing 12 is shown as being cylindrical, although a variety of other suitable sizes and shapes are also acceptable. The shell casing can be made out a variety of conventional materials known in the field, for example, steel.

The shell casing 12 includes a refrigerant vapor inlet port 14 and refrigerant liquid exit port 16. In the embodiment shown in the drawings, the refrigerant vapor inlet port 14 is in the shape of a flange attached or welded to the top surface of shell casing 12. It should be understood that any other type of suitable inlet port for entering refrigerant is also acceptable. In the embodiment shown in the drawings, the refrigerant liquid exit port 16 is in the shape of a flange attached or welded to a bottom surface of shell casing 12. Other suitable configurations are also acceptable. In a typical embodiment, refrigerant vapor coming from the compressor discharge of an HVAC system, or other source, enters the shell casing 12 at the refrigerant vapor inlet port 14 and exits in condensed form through the refrigerant exit port 16. It should be understood that a variety of conventional heat exchanger shell casings are suitable for the present invention. The size of the shell depends on the amount of cooling that is desired. The typical shell diameter ranges between 20 to 60 inches, with 36 to 48 inches being most typical. The typical shell length ranges between 13 to 20 feet with 13 to 16 feet being most typical. Condensers much smaller and much larger than these typical ones are clearly suitable for use with present invention as well. The values above are for purposes of example only.

Figure 1A:
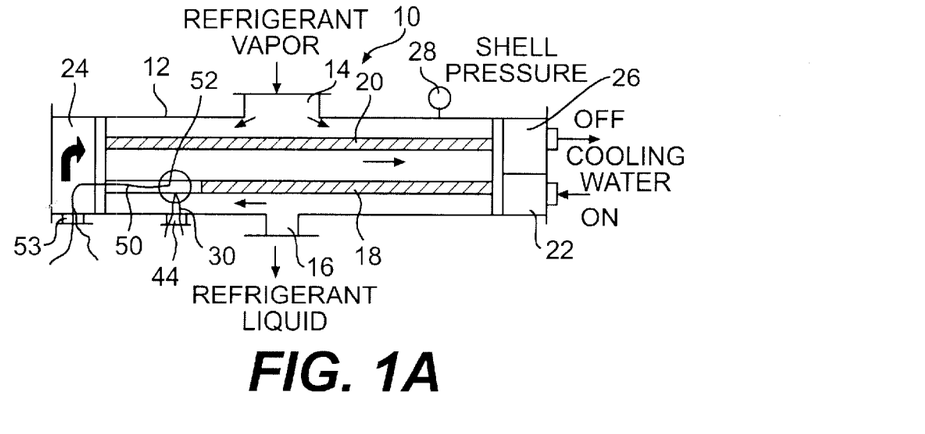
FIG. 1A is a side cross-sectional view of a heat exchanger with a fouling detection system according to the present invention.
Figure 1B:
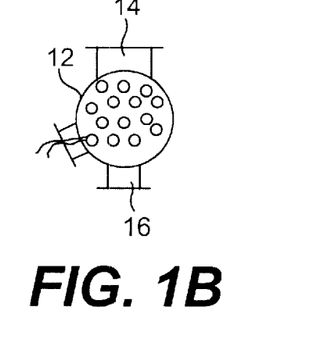
FIG. 1B is an end view of the heat exchanger of FIG. 1A.

In one preferred embodiment of the present invention, the heat exchanger includes a plurality of tubes located inside the shell-type casing. As embodied herein and shown in FIGS. 1–2, a plurality of hollow tubes 18, 20 are provided in the heat exchanger. The hollow tubes extend across the length of the shell casing in a parallel fashion. The embodiment shown in FIG. 1A illustrates a double-pass tubing arrangement with an inlet tube 18 and exit tube 20. In the double-pass tubing arrangement of FIG. 1A, the heat transfer fluid travels in a first direction (to the left in FIG. 1A) through an inlet tube 18 of the heat exchanger and exits through an exit tube 20, the heat transfer fluid traveling in a second direction (to the right in FIG. 1A) opposite the first direction. For ease of understanding, FIG. 1A only shows one inlet tube and one exit tube. However, the typical condenser of the present invention has a large number of such tubes.

The heat transfer fluid in a typical condenser is water, however, other suitable fluids are also acceptable. The cooling water typically comes from a cooling tower. Impurities such as chemicals, salts, and pollutants are typically contained in the cooling water. These impurities cause fouling in the heat transfer tubes after a period of time. Fouling comes in a variety of forms, but is generally defined as the deposit of solid insulating material on a heat transfer surface. The cooling water leaves the cooling tower and enters the shell casing 12 through cooling water inlet 22. The water then flows into inlet tube 18, flows across the length of the condenser, and flows into a return water box 24, as shown in FIG. 1A. The water in the return water box 24 then flows into the exit tube 20, and flows to the right as shown in FIG. 1A. The water then exits the exit tube 20, flows into the water outlet 26, and exits the condenser in a warmed state. The water flowing through the tubes absorbs heat from the refrigerant vapor which passes across the outer surface of tubes 18 and 20, thereby increasing the water temperature from its initial temperature at the cooling water inlet 22. The amount of increase in water temperature varies depending on the coolant flow rate, the size of the tubes, the total heat load, and other heat transfer characteristics of the condenser. Water entering the inlet 22 typically has a temperature ranging from 55 to 90 deg. F., with 85 deg. F. being a standard rating point. Water leaving exit 26 typically has a temperature ranging from 69 deg. F. to 110 deg. F., with 94 to 95 degrees being most typical. These values are described by way of example only.

The heat exchanger of the present invention is also well-suited for a single-pass or triple-pass arrangement, or other arrangement with more passes. In a single-pass arrangement, the heat transfer fluid enters a tube in the shell at a first end, travels across the length of the shell through the tube, and exits the tube and the condenser at the second end. The tube in a single-pass arrangement is commonly referred to as having made one pass through the heat exchanger. In a triple-pass arrangement, the heat transfer fluid passes in a first direction, second direction, and then back in the first direction. Other arrangements having a greater number of passes are also suitable with the present invention.

The present invention is suitable with a wide range of types of shell and tube condensers. A typical shell and tube condenser contains a large number of tubes, such as 800 to 2000 tubes. However, the present invention is suitable for a shell and tube condenser with any number of tubes, ranging from one to several thousand. The tubes are typically bundled together in a parallel fashion, normally in the shape of a grid, as shown for example in FIGS. 1B and 2B. The number of tubes and the arrangement varies depending on the requirements of the specific application. The tubes are typically made out a thermally conductive material such as copper. Other suitable materials include, but are not limited to, copper/nickel alloy, steel, and titanium.

The tubes can be of any conventional design known in the art. Heat transfer tubes in the present invention may include any of the known surface enhancements that are commonly available. In one embodiment, the inside diameter of the tube has short helical ribs. In this embodiment, the helical ribs extend at angle of 45 degrees with an axial pitch of 0.167 to 0.050 inch. A 0.050 inch axial pitch rib will typically have rib height of approximately 0.015 inch. A typical enhanced tube will also have outside diameter surface enhancements including helical fins that are nearly radial. These type of enhanced tubes allow condensing to more easily occur because the notches help to keep condensing liquid away from the tube. In one embodiment, the helical fins on the outside of the tube have a height of 0.030 to 0.060 inch and a frequency of between 19 to 40 fins per inch. The fins typically include v-shaped notches. In one embodiment these v-shaped notches are approximately 0.013 inch deep and located at a frequency of approximately 33 per inch. These specific values for the surface enhancements are by way of example only, and can greatly vary depending on the size of the tube and the desired performance of the heat exchanger. Alternately, one or both of the inner and outer surfaces of the tubes could be smooth, with no surface enhancements. The type of tubes is not an essential part of the present invention and is included for purposes of illustration only.

In accordance with the present invention, a first temperature sensor is included for sensing the temperature of a surface of the tube at a first axial position of the tube. As embodied herein and shown for example at FIG. 1, a first temperature sensor 30 is attached to the tube outer surface for measuring the temperature of the tube. The first temperature sensor is typically a thermocouple, however other suitable measuring devices such as a thermistor, a Integrated Circuit Temperature Device (ICTD), or Resistance Temperature Device (RTD) may also be used. The temperature sensor may be attached to the tube in order to measure the temperature of the tube wall by any suitable method. It is desirable to select a tube that is representative of a large number of the tubes when deciding on which of the tubes the temperature sensors should be placed. Tubes on the top of the shell casing are typically exposed to superheated refrigerant, whereas tubes at the bottom are exposed to a greater amount of condensed refrigerant. It is also desirable to select a tube which can be easily accessed for instrumentation. For increased accuracy, it is also possible to attach temperature sensors to more than one tube. Besides the temperature sensors, a variety of other standard instrumentation is provided to the heat exchanger, such as a pressure transducer 28 for measuring the pressure inside the shell.

Figure 3A:
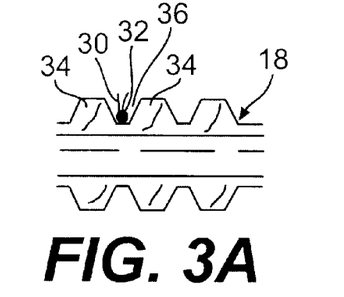
FIGS. 3A, 3B, and 3C are side cross-sectional views of a condenser tube with a thermocouple attached thereto.
Figure 3B:
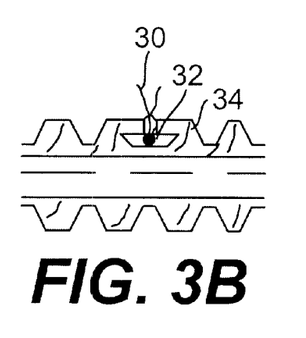
Figure 3C:
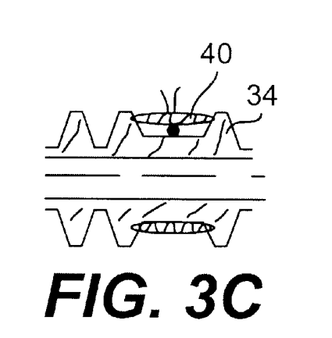

FIGS. 3A–3C illustrate three examples of methods of attaching a thermocouple 30 to the tube for temperature measurement of the tube wall. FIGS. 3A–3C show an embodiment with fins 34 on an outer surface on the tube 18, as previously discussed. The fins 34 are not drawn to scale in FIGS. 3A–3C in order to more easily illustrate the attachment methods. In FIG. 3A, the ends of the thermocouple wires 30 are fused together to form a thermocouple bead 32. The thermocouple bead 32 is then soldered to the outside surface of the tube between two fins 34. Preferably, a sufficient amount of solder material 36 is used so that the ends of the wires 30 are not exposed to the condensing vapor and can therefore better obtain a temperature reading that is representative of the tube wall temperature. FIG. 3B shows another possible method of attaching a thermocouple to the tube. In FIG. 3B, the thermocouple bead 32 at the end of the wires 30 is placed between two adjacent fins 34 which are then bent toward each other so that they touch and surround the thermocouple bead. The fins 34 hold the thermocouple bead 32 therebetween in a secure fashion. FIG. 3C shows a further possible method of attaching a thermocouple to a tube. In FIG. 3C, a clamp 40 in the shape of a ring is placed around a thermocouple bead 32 on the tube. The clamp 40 is tightened around the circumference of the tube in a position between two adjacent fins 34. The clamp ensures that the thermocouple bead 32 is pressed firmly against the tube outer surface. While FIGS. 3A–3C illustrate three examples of methods for attaching a thermocouple to the outside surface of a finned heat exchanger, other suitable methods are also acceptable. In the illustrated methods, it is desirable to use a material (for attaching) that does not have a high heat transfer rate, in order to ensure that the temperature of the tube is being accurately measured.

The thermocouple wires 30 may be introduced into the shell by a variety of methods. One method is to provide a thermocouple flange 44 on the outside of the shell casing 12 as shown in FIG. 1A. The thermocouple wire, which is typically surrounded by a metal sheath (not shown), may be inserted through the flange and into the interior of the shell casing 12. The flange typically includes a small hole in the form of a thermocouple gland or feedthrough hole so that a seal may be formed between the thermocouple sheath and the flange.

Alternately, in order to avoid having to physically attach a temperature sensor to the tube, an infrared temperature sensing device could be used to measure the temperature of the tube. An infrared temperature sensing device may be arranged adjacent the shell casing and directed so that the temperature of the tube wall can be sensed by the device. In order to provide this type of sensing arrangement, the thermocouple flange is modified by replacing the thermocouple gland with a small window of material that is transparent to infrared radiation inside the flange cylinder, or with a gland suitable for a sealed infrared radiation detector. The use of an infrared temperature sensing device reduces the amount of wiring, and the resulting danger of leaks due to the wiring.

In accordance with the present invention, a system and method for determining the temperature of the heat transfer fluid inside the tube at the first axial position corresponding to the position of the first temperature sensor is included. The temperature of the heat transfer fluid at the first axial position can be determined either directly or indirectly. The direct measurement method shown in the embodiment of FIG. 1 will be discussed first. As embodied herein and shown for example at FIG. 1, a second temperature sensor 50, may be positioned inside the tube at the same axial position as the first thermocouple 30, in order to directly measure the temperature of the cooling water in the tube. The second temperature sensor may be any of the types of temperature sensors envisioned and discussed above for the first temperature sensor, such as a thermocouple.

Figure 4:
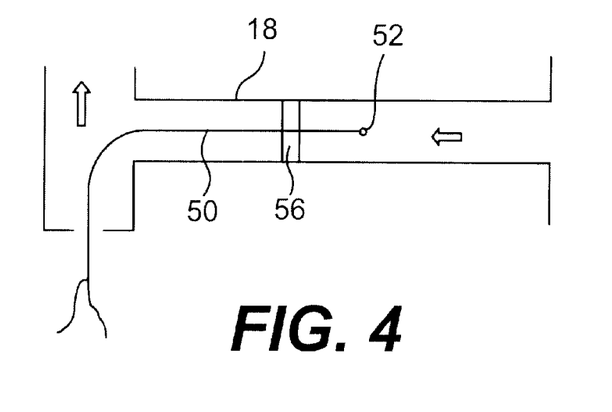
FIG. 4 is a side cross-sectional view of a heat exchanger with a thermocouple placed within the tube.
Figure 5A:
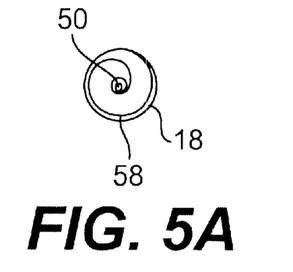
FIGS. 5A and 5B are clips used to support the thermocouple of FIG. 4 within a tube.
Figure 5B:
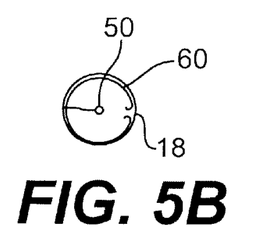

The second thermocouple 50 may be placed inside the tube 18 by a variety of methods. In one method, the wire of second thermocouple 50 is extended through a flange 53 on the return water box 24, through the return water box 24, and into the second end of tube 18. The second thermocouple 50 is then translated inside the second end of the tube until the end 52 of the second thermocouple 50 is axially aligned with the first thermocouple 30, as shown for example in FIG. 1A. The second thermocouple 50 is preferably positioned so that the thermocouple end 52 is located in the center of the tube. This centering ensures an accurate temperature reading for the water in the tube. The second thermocouple can be constructed of sufficiently rigid material so that the second thermocouple extends in a cantilever fashion inside the tube. In an alternate method of positioning the thermocouple end so that it is centered and aligned with the first thermocouple, a support clip is provided inside the tube. As shown in FIG. 4, a support clip 56 is provided for supporting the thermocouple inside the tube and maintaining the thermocouple in the center of the tube. Several types of support clips are suitable with the present invention, such as the spiral support clip 58 shown in FIG. 5A and the ring and web support clip 60 shown in FIG. 5B. It is desirable for the supporting structure for the thermocouple and thermocouple itself to be designed to minimize any disturbances in the flow of the cooling water through the tube so that the tube in which the measurement is taken resembles a tube without instrumentation as much as possible.

The provision of first temperature sensors 30 on the tube wall surface and second temperature sensor 50 inside the tube permits an initial measurement of the temperature difference between a tube wall and the water in the tube at the same axial position at an initial clean tube condition. This value will be referred to as the initial temperature difference. After a preselected period of time, the temperature difference between the tube wall and the water itself can be measured. This later value will be referred as the later temperature difference. As explained below, a change in the temperature difference between the tube wall and the water, at a fixed water flowrate and heat load, is a measure of the change of thermal resistance of the tubes caused by fouling.

In accordance with the present invention, the heat exchanger includes a water fouling detector for calculating the degree of fouling that has occurred in a heat transfer tube. As embodied herein, the water fouling detector calculates the degree of fouling based on the initial temperature difference between the temperature of a surface of a tube and the temperature of water in the tube at a first axial position, and a later temperature difference between the temperature of a surface of the tube and the temperature of the water in the tube at the first axial position. The change in the temperature difference used to calculate the degree of fouling is not influenced by the refrigerantside at all. The measurements are isolated to the tubes themselves, thereby removing a great number of factors which may cause errors and inaccuracies. Therefore, even a major change in refrigerantside performance will not disturb the accurate detection of fouling since only measurements on the waterside are taken.

The embodiment discussed above and shown in FIG. 1 illustrates a direct method of determining tube fouling. If we assume constant heat load, constant flowrate, zero initial waterside fouling and a negligible initial thermal resistance for the tubes (based on copper tubes), then the equation for calculating the fouling resistance is:

$$R_f = R_w \times (\Delta T_{later}/\Delta T_{initial}) - R_w$$

where: $R_w$ is the calculated waterside heat transfer resistance at a known water flow rate [(hr×ft²×deg. F.)/Btu]; $\Delta T_{initial}$ is the temperature difference between the initial temperature of the tube ($T_{tube}$) and the initial temperature of the heat transfer fluid in the tube ($T_{fluid}$) at the first axial position; and $\Delta T_{later}$ is the temperature difference between the later temperature of a surface of the tube ($T_{tube}$) and the later temperature of the heat transfer fluid in the tube ($T_{fluid}$) at the same first axial position. Generally, the equation shows that the ratio of later to earlier temperature differences is proportional to the fouling that has taken place. The value for $R_w$ for a specific tube can be calculated for a given tube based on the known water flowrate. This value can be manually calculated off a chart or automatically calculated by a processor.

As discussed, the above equation assumes constant heat load and water flow rate at the initial measurement time and the later measurement time. If system piping variables are likely to change from one time to another in a specific application, a flow sensor may be used. If a flow sensor is used, the value for $R_w$ may be adjusted to account for any change in the water flow rate. Alternately, the system may be configured so that the operator can set the controls to the initial flow rate before the later temperature measurements are taken.

While an example of an equation that can be used to determine the degree of fouling has been provided, it should be apparent that the scope of the invention is not limited to one equation, based on one set of assumptions. Instead, a wide variety of analytical or empirical models can be applied to a given condenser system, as long as the fouling, or degree of fouling, is determined as a function of the temperature differentials measured at two separate preselected times. Preferably, the first measurement is made and the second measurement is made later, after the condenser has been placed in operation for a period of time. The relationship between the temperature differences and the fouling can be determined through theoretical equations, or through empirical testing, or a combination of both.

In a preferred embodiment, a microprocessor, or other similar signal processor, is typically used for storing the temperature measurements and calculating the corresponding fouling value. In a typical commercial application, the chiller microprocessor control panel is suitable for water fouling calculations. The microprocessor may display the resulting fouling value and may initiate a warning signal if a predetermined fouling value is exceeded. The predetermined fouling value will depend on the specific application. A typical standard value for a condenser tube in one embodiment is approximately 0.00025[(hr×ft²×deg. F.)/Btu].

Figure 2A:
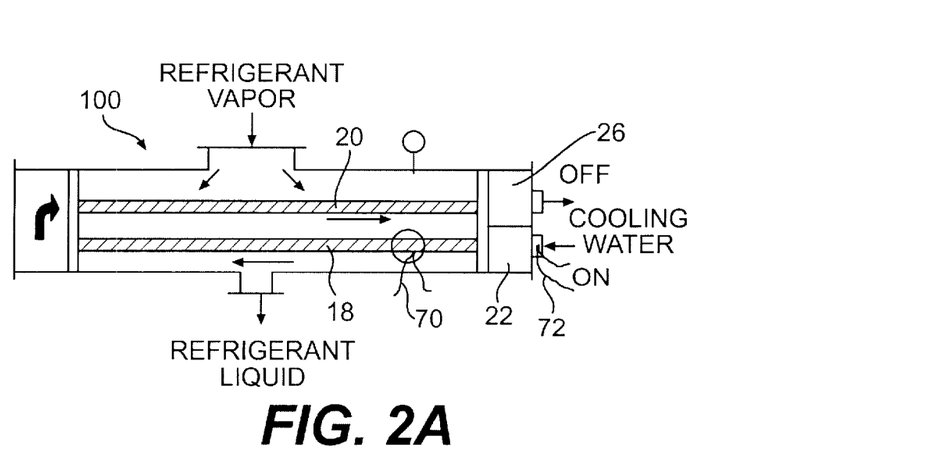
FIG. 2A is a side cross-sectional view of a heat exchanger with a fouling detection system according to another embodiment of the present invention.
Figure 2B:
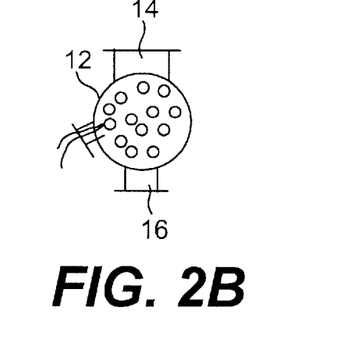
FIG. 2B is an end view of the heat exchanger of FIG. 2A.

In accordance with another embodiment of the present invention, the temperature of the heat transfer fluid inside the tube at the axial position of the first temperature sensor can be determined indirectly. As embodied herein, and shown for example in FIGS. 2A and 2B, the condenser 100 includes a first temperature sensor 70 similar to that described in the embodiment of FIG. 1. The heat exchanger further includes a second temperature sensor 72 located at a second axial position distant from the axial position of the first temperature sensor 70. In the embodiment shown in FIG. 2, the second temperature sensor 72 is located at the inlet 22 of the condenser. The instrumentation of this embodiment is simpler than that shown in FIG. 1, in that a thermocouple does not need to be inserted inside the tube. The standard inlet water temperature sensor that is found on a conventional condenser can be utilized as the second temperature sensor 72. Therefore, the arrangement of FIG. 2 only requires one additional temperature sensor, thereby reducing the amount of additional instrumentation that is used. The remainder of the condenser 100 of the embodiment shown in FIG. 2 is identical to the condenser 10 of FIG. 1.

The second temperature sensor 72 of condenser 100 measures a water temperature prior to entry of the tube, the value of which is used to calculate the temperature of the water (or other heat transfer fluid) inside the tube at a first axial position adjacent the first temperature sensor 70. The "calculated" value of the temperature of the water can be determined by using theoretical equations or empirical testing as will be described below.

The first temperature sensor 70 is identical to the temperature sensor 30 described for FIG. 1, except for its axial position. The first temperature sensor 70 measures the temperature of the tube at a predetermined distance from the inlet 22 of the tube. The determination of the distance from the inlet 22 is a balance between several factors. First, the amount of fouling that occurs in the area adjacent the inlet is limited, therefore the first temperature sensor should be placed far enough downstream that to avoid the area where the fouling is artificially limited because of flow disturbances at the inlet. On the other hand, it is more difficult to accurately calculate the temperature value of the heat transfer fluid as the distance from the inlet increases. Therefore, it is desirable to place the first temperature sensor 70 at the closest distance from the inlet where fouling is not artificially limited by flow disturbances caused by the inlet. In one particular embodiment, the first temperature sensor 70 is placed at least twelve inches downstream from the inlet, however, this distance varies depending on the size and internal surfaces of the tubes, and the water flow rate.

The water temperature inside the tube at the first axial position (adjacent to first thermocouple 70) is then calculated based on the water temperature at the inlet, the performance of the unit, and the distance between the first and second temperature sensors. The performance of any given unit is known based on factory performance testing where the inlet and exit water temperature as well as refrigeration saturation temperature are measured in order to calculate the heat transfer coefficient for the condenser at a reference operating condition and heat load. Assuming a constant heat transfer coefficient along the tube, the local water temperature at any axial location in a tube may be calculated using an equation commonly referred to as the heat exchanger effectiveness equation. This equation produces an exponential change in the water temperature from the inlet to the exit where the water temperature approaches the refrigeration saturation temperature. Although the heat transfer coefficient will change slightly due to fouling, the temperature increase between the inlet and the selected position will change only slightly due to fouling because the system will be returned to the initial heat load in order to perform the measurements at the later time. The operator forces the system to return to the initial heat load so that the amount of fouling can be accurately calculated.

The temperature of the water will increase in the distance between the second and first sensors due to heat transfer from the refrigerant vapor as it condenses. Therefore, for the reasons discussed above, the temperature of the water inside the tube at the first axial position may be determined based on the temperature reading at the second thermocouple 72.

With the configuration of FIG. 2, the temperature of the water inside the tube at the first axial position can be calculated in other alternate ways besides the method described above. One alternate manner is to test a sample condenser at a variety of operating conditions. The temperature of the water inside the tube at the first axial position can be measured at a variety of operating conditions so that the temperature difference between the first axial position and the inlet of the tube can be empirically determined for a range of conditions. In this manner, when an identical tube is utilized in a similar condenser at the same operating conditions, the empirical data can be stored in a computer that can estimate the temperature difference between the inlet water and the water inside the tube at the first axial position.

Once the temperature of water inside the tube at the first axial position is determined at an initial clean condition and a later fouled condition, the level of fouling can be determined in a manner identical to that used in the earlier embodiment.

According to another alternate embodiment of the present invention, a single tube auxiliary condenser is provided parallel to a standard shell and tube condenser.

Figure 6A:
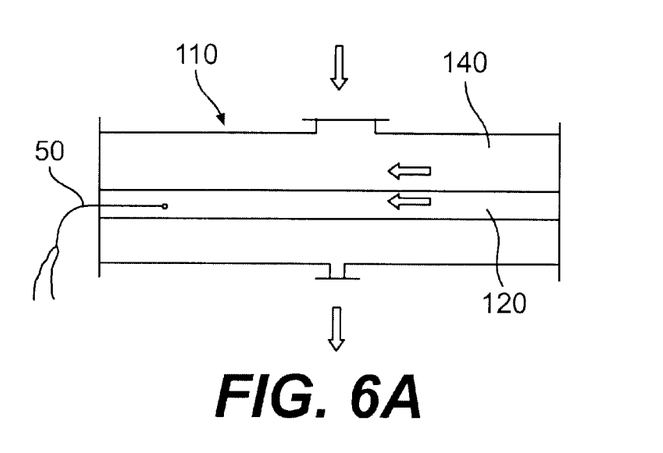
FIG. 6A is a side cross-sectional view of a heat exchanger with an auxiliary system according to another embodiment of the present invention.
Figure 6B:
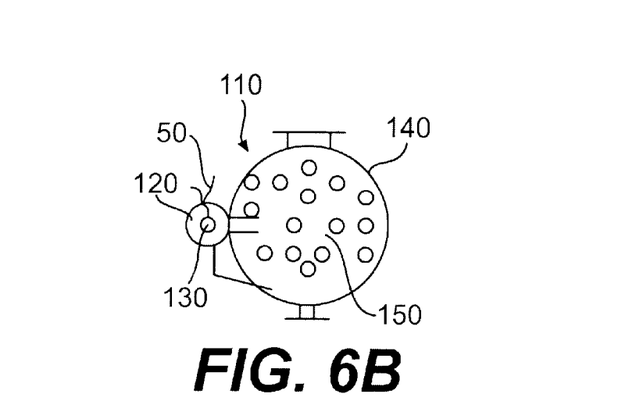
FIG. 6B is an end view of the heat exchanger of FIG. 6A.

As embodied herein and shown in FIGS. 6A and 6B, a condenser 110 can be provided with an auxiliary condenser shell 120 and an auxiliary heat transfer tube 130. In such an embodiment, a conventional condenser shell casing 140 is modified so that the refrigerant vapor from the shell casing may flow into the auxiliary condenser shell 120 and flow around the outside surface of heat transfer tube 130. The arrangement of FIG. 6 enables a temperature measurement of tube wall as well as of the water on the inside of the tube without disturbing the main bundle 150 of tubes. The condenser should be arranged so that the auxiliary heat transfer tube is exposed to conditions that are typical of the heat transfer tubes in the main conventional condenser shell casing 140. Although the drawings show the auxiliary condenser shell 120 having a length equal to the main shell casing 140, the auxiliary condenser shell may alternately be of a shorter length than the main shell casing.

Although the above description describes a system where the temperature difference between the tube and the fluid in the tube at a first axial position at an initial time and at a later time are used to calculate the degree of fouling, temperature measurements and calculations can be performed at a variety of different axial positions. The degree of fouling can be calculated without determining the temperature of the heat transfer fluid inside the tube at the first axial position where the tube temperature was measured. The temperature of the heat transfer fluid may be determined at any position, and the values of the various temperature readings can be input into an empirical formula, without the need to directly determine the temperature of the heat transfer fluid at the first axial position where the tube temperature was sensed. This allows greater flexibility in performing the calculations for the degree of fouling.

The operation of the system and a method of detecting fouling will be described below. In the preferred embodiment, the heat exchanger is a condenser, however, the present invention can also be used in an evaporator as well. For the sake of the discussion below, the operation will be described with regard to a shell and tube condenser.

First, cleaned or new tubes are installed in the condenser. The condenser is then operated for a short period of time. After this short period of time and before any fouling begins to occur, temperature measurements are taken through the thermocouples. In the arrangement of FIG. 1, the initial temperature of the tube wall at the first axial position is measured by first thermocouple 30. Simultaneously, the initial temperature of the water inside the tube at the first axial position is measured by second thermocouple 50. These initial values are then sent to a microprocessor where the initial temperature difference between the water at the first axial position and the tube wall at the first axial position is calculated and stored for later use in determining the fouling factor.

The condenser is then operated for a given amount of time after which additional temperature readings at the first and second thermocouples, 30 and 50, are taken. These later temperature readings are subtracted from one another in the microprocessor to calculate the later temperature difference between water at the first axial position and the tube wall at the first axial position. The microprocessor can then use the initial and later temperature differences to calculate the amount of fouling in the condenser tubes based on the formula $R_f = R_w \times (\Delta T_{later}/\Delta T_{initial}) - R_w$, as previously described above, or based upon another formula or stored set of empirical data that applies to the given condenser and its operating characteristics. If the determined fouling factor is above a predetermined value, a warning signal may be provided, otherwise, the condenser may continue operating and later temperature measurement will be taken again after a predetermined amount of time.

As is evident from the above description, the present invention includes a method of detecting fouling in a condenser having a heat transfer fluid flowing through a tube and a refrigerant flowing over an outer surface of the tube. The method includes the steps of sensing a first temperature of the tube at a first axial position; simultaneously determining a first temperature of the heat transfer fluid in the tube at a position corresponding to the first axial position; calculating the difference between the first temperature of the tube and the first temperature of the heat transfer fluid in the tube; sensing a second temperature of the tube at the first axial position after operating the condenser for a period of time; simultaneously determining a second temperature of the heat transfer fluid in the tube at a position corresponding to the first axial position at the second point in time; calculating the difference between the second temperature of the tube and the second temperature of the heat transfer fluid in the tube; and determining the fouling resistance of the tube. The determination of the fouling resistance of the tube is a factor of the difference between the first temperature of the tube and the first temperature of the heat transfer fluid in the tube, and the difference between the second temperature of the tube and the second temperature of the heat transfer fluid in the tube.

Although the above description is directed toward the use of the present invention in a condenser, the principles of the invention are also suitable for a evaporator. In a typical evaporator, refrigerant liquid will enter the bottom of the shell casing. The tube bundles will typically be submerged in the liquid refrigerant. A heat transfer fluid such as water having a higher temperature flows through the inlet and exit tubes. The hot water inside the tubes causes a heat transfer to the refrigerant liquid, causing the refrigerant to vaporize and evaporate, thereby cooling the water in the tubes. This cooled water can subsequently be used to cool an HVAC system used, for example, in a large office building. The vaporized refrigerant exits out of the top of the shell casing.

The same equations as previously described for a condenser for calculating $R_f$ apply to an evaporator. However, because the water temperature is higher than the tube temperature in an evaporator, the temperature difference will appear as a negative value. This negative value is simply converted to a positive value. Also, the result of fouling in an evaporator at a fixed heat load will be a reduction in the refrigerant saturation temperature, as opposed to the increase that was discussed for an condenser. This decrease in refrigerant saturation temperature results in a greater power requirement for a fixed heat load.

Fouling of the precipitation type is not as large of a problem in evaporators as in condenser because the tube walls have a lower temperature than the water circulating inside. Because of the lower temperature of the tube walls, the chemicals do not undergo inverse solubility as they do in the condenser. However, other types of fouling such as particulate fouling occur in evaporators, therefore, the present invention is useful in evaporators.

Detection of fouling can also be important in single-phase shell and tube heat exchangers. In single-phase heat exchangers both heat transfer mediums remain as a liquid or a gas. Therefore, saturation temperatures are not involved in the process. The detection method of the present invention can be used in single-phase heat exchangers to determine on which side of the tubes the fouling has taken place. Any evidence of fouling, on either side, will result in an increase of the total heat transfer resistance, as measured from the indicated overall temperature differences of the system at constant heat load and fluid flow rates. Use of the technique of the present invention permits independent measurement of the fouling on the tube side. Comparison of the fouling resistance on the tube side with the total fouling resistance increase (from both internal and external fouling) will show if the total fouling resistance change is a result of internal or external tube fouling. If fouling has occurred internally and externally, the present method permits independent calculation of each of these values. It should be understood that all of the above equations apply to single-phase heat exchangers. In a single-phase heat exchanger, the wiring techniques for the temperature sensor for the outside of the tube may need to be made more robust due to the increased flow velocity of the fluid on the outside of the tubes. Any known method of securely fastening a temperature sensor to a tube, such as the use of a hypodermic sheath, may be utilized to ensure a dependable measurement of the tube wall temperature.

It will be apparent to those skilled in the art that various modifications and variations can be made in the apparatus and method for detecting fouling in a heat exchanger, use of the apparatus of the present invention, and in construction of this apparatus, without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A shell and tube heat exchanger system for transferring heat between a refrigerant flowing over an outer surface of a tube and a heat transfer fluid flowing through the tube, said system comprising:
   a tube including a first end and second end, the tube having an axial length;
   a first temperature sensor associated with said tube for sensing the temperature of the tube ($T_{tube}$);
   a device associated with the interior of said tube for determining the temperature of the heat transfer fluid ($T_{fluid}$) inside the tube; and
   a fouling detector coupled to said first temperature sensor and said device, for calculating the degree of fouling in the tube based on the temperature ($T_{tube}$) of the tube and the temperature of the heat transfer fluid ($T_{fluid}$)in the tube at an initial time and a later time.

2. The shell and tube heat exchanger system of claim 1, wherein the first temperature sensor is positioned to sense the temperature of the tube ($T_{tube}$) at a first axial position of the tube, the device is positioned to determine the temperature of the heat transfer fluid ($T_{fluid}$)inside the tube at the first axial position of the tube, and the fouling detector calculates the degree of fouling in the tube based on the initial temperature difference ($\Delta T_{initial}$) between the temperature of the tube ($T_{tube}$) and the temperature of the heat transfer fluid in the tube ($T_{fluid}$) at the first axial position, and a later temperature difference ($\Delta T_{later}$) between the temperature of the tube ($T_{tube}$) and the temperature of the heat transfer fluid in the tube ($T_{fluid}$) at the first axial position.

3. The shell and tube heat exchanger system of claim 2, wherein the device for determining the temperature of the heat transfer fluid ($T_{fluid}$) inside the tube comprises a second temperature sensor located in the tube at the first axial position.

4. The shell and tube heat exchanger system of claim 3, further comprising a support structure inserted into the tube for centering the second temperature sensor in the tube.

5. The shell and tube heat exchanger system of claim 4, wherein said support structure and second temperature sensor are connected to the fouling detector through one of the ends of the tube.

6. The shell and tube heat exchanger system of claim 3, wherein the fouling detector calculates the degree of fouling $R_f$ based on the following formula:

$$R_f = R_w \times (\Delta T_{later}/\Delta T_{initial}) - R_w$$

where: $R_w$ is a calculated waterside heat transfer resistance at a known water flow rate [(hr×ft²Δdeg. F.)/Btu]; $\Delta T_{initial}$ is the temperature difference between the initial temperature of the tube ($T_{tube}$) and the initial temperature of the heat transfer fluid in the tube ($T_{fluid}$)at the first axial position; and $\Delta T_{later}$ is the temperature difference between the later temperature of the tube ($T_{tube}$) and the later temperature of the heat transfer fluid in the tube ($T_{fluid}$) at the first axial position.

7. The shell and tube heat exchanger system of claim 2, wherein the device for determining the temperature of the heat transfer fluid in the tube at the first axial position comprises a temperature sensor located at a second axial position and a processor for calculating the temperature of the heat transfer fluid ($T_{tube}$) in the tube at the first axial position based on the temperature at the second axial position.

8. The shell and tube heat exchanger system of claim 7, wherein the second axial position is adjacent the inlet of the heat exchanger.

9. The shell and tube heat exchanger system of claim 2, wherein the heat transfer fluid comprises water.

10. The shell and tube heat exchanger system of claim 2, wherein the heat exchanger system is part of a condenser.

11. The shell and tube heat exchanger system of claim 2, wherein the heat exchanger system is part of an evaporator.

12. A system for calculating the degree of fouling in a heat exchanger having at least one longitudinal tube inside of a shell, the shell having a first heat exchange medium flowing inside the tube and a second heat exchange medium flowing across the outside surface of the tube, said system comprising:

a first temperature sensor associated with said tube for sensing the temperature ($T_{tube}$) of the tube at a first axial position of the tube;

a device associated with the interior of said tube for determining the temperature of the first heat exchange medium ($T_{medium}$) inside the tube at the first axial position of the tube; and a fouling detector coupled to said first temperature sensor and said device, for calculating the degree of fouling in the tube based on the initial temperature difference ($\Delta T_{initial}$) between the temperature of the tube ($T_{tube}$) and the temperature of the first heat exchange medium in the tube ($T_{fluid}$) at the first axial position, and a later temperature difference ($\Delta T_{later}$) between the temperature of the tube ($T_{tube}$) and the temperature of the first heat exchange medium in the tube ($T_{medium}$) at the first axial position.

13. The system of claim 12, wherein the first heat exchange medium comprises a heat transfer fluid and the second heat exchange medium comprises a refrigerant.

14. The system of claim 13, wherein the heat transfer fluid comprises water.

15. The shell and tube heat exchanger system of claim 12, wherein the heat exchanger system is part of a condenser.

16. The shell and tube heat exchanger system of claim 12, wherein the heat exchanger system is part of an evaporator.

17. The system of claim 12, wherein the first heat exchange medium and the second heat exchange medium have the same phase so that the heat exchanger functions as a single-phase heat exchanger.

18. The system of claim 17, wherein the first heat exchange medium and the second heat exchange medium comprise liquids.

19. The system of claim 17, wherein the first heat exchange medium and the second heat exchange medium comprise gases.

20. A method of detecting fouling in a heat exchanger having a first heat exchange fluid flowing through a tube and a second heat exchange fluid flowing over an outer surface of the tube, the method comprising the steps of:

sensing a first temperature of the tube at a first axial position;

simultaneously with sensing the first temperature of the tube at the first axial position, determining a first temperature of the first heat exchange fluid in the tube at a position corresponding to the first axial position;

calculating the difference between the first temperature of the tube and the first temperature of the first heat exchange fluid in the tube;

sensing a second temperature of the tube at the first axial position after operating the condenser for a period of time;

simultaneously with sensing the second temperature of the tube at the first axial position, determining a second temperature of the first heat exchange fluid in the tube at a position corresponding to the first axial position at the second point in time;

calculating the difference between the second temperature of the tube and the second temperature of the first heat exchange fluid in the tube; and determining the fouling resistance of the tube as a function of: the difference between the first temperature of the tube and the first temperature of the first heat exchange fluid in the tube, and the difference between the second temperature of the tube and the second temperature of the first heat exchange fluid in the tube.

21. The method of claim 20, wherein the step of determining the fouling resistance includes the step of calculating the heat transfer resistance of the tube at a given water flow rate.

22. The method of claim 20, wherein the steps of determining a first and second temperature of the first heat exchange fluid comprise sensing the temperature of first heat exchange fluid using a second temperature sensor located in the tube at the first axial position.

23. The method of claim 20, wherein the steps of determining a first and second temperature of the first heat exchange fluid each comprise sensing the temperature of the first heat exchange fluid at a second axial position and calculating the temperature of the first heat exchange fluid in the tube at the first axial position based on the sensed temperature at the second axial position.

24. The method of claim 23, wherein the second axial position is located adjacent the inlet of the heat exchanger.

25. The method of claim 20, wherein the first heat transfer heat exchange fluid comprises a heat transfer fluid and the second heat exchange fluid comprises a refrigerant.

26. The method of claim 25, wherein the heat transfer fluid comprises water.

27. The method of claim 20, wherein the heat exchanger functions as a condenser.

28. The method of claim 20, wherein the heat exchanger functions as an evaporator.

29. The method of claim 20, wherein the first heat exchange fluid and the second heat exchange fluid have the same phase so that the heat exchanger functions as a single-phase heat exchanger.

30. The method of claim 29, wherein the first heat exchange medium and the second heat exchange medium comprise liquids.

31. The method of claim 29, wherein the first heat exchange medium and the second heat exchange medium comprise gases.

32. A method of detecting fouling in a heat exchanger having a first heat exchange fluid flowing through a tube and a second heat exchange fluid flowing over an outer surface of the tube, the method comprising the steps of:

sensing both the temperature of the first heat exchange fluid flowing through the tube and the temperature of the tube at two different times; and determining the amount of fouling in the tube based on the above sensed temperatures.

* * * * *

UNITED STATES PATENT AND TRADEMARK OFFICE
CERTIFICATE OF CORRECTION

PATENT NO. : 6,386,272 B1
DATED : May 14, 2002
INVENTOR(S) : Keith E. Starner et al.

It is certified that error appears in the above-identified patent and that said Letters Patent is hereby corrected as shown below:

Column 14,
Line 23, "$(T_{fluid})$in" should read -- $(T_{fluid})$ in --.
Line 29, "$(T_{fluid})$inside" should read -- $(T_{fluid})$ inside --.
Line 57, "$[(hr \times ft^2 \Delta deg. F.)/Btu]$" should read -- $[(hr \times ft^2 \times deg. F.)/Btu]$ --;
Line 61, "$(T_{fluid})$at" should read -- $(T_{fluid})$ at --.

Column 15,
Line 32, $(\Delta T_{initial})$" should read -- $(\Delta T_{initial})$ --.

Column 16,
Line 23, "the heat" should read -- a waterside heat --.

Signed and Sealed this

Eighth Day of October, 2002

Attest:

JAMES E. ROGAN
Attesting Officer  Director of the United States Patent and Trademark Office